July 31, 1923.
W. S. HUFF
FIREPROOF TANK
Filed July 21, 1919
1,463,268
4 Sheets-Sheet 2
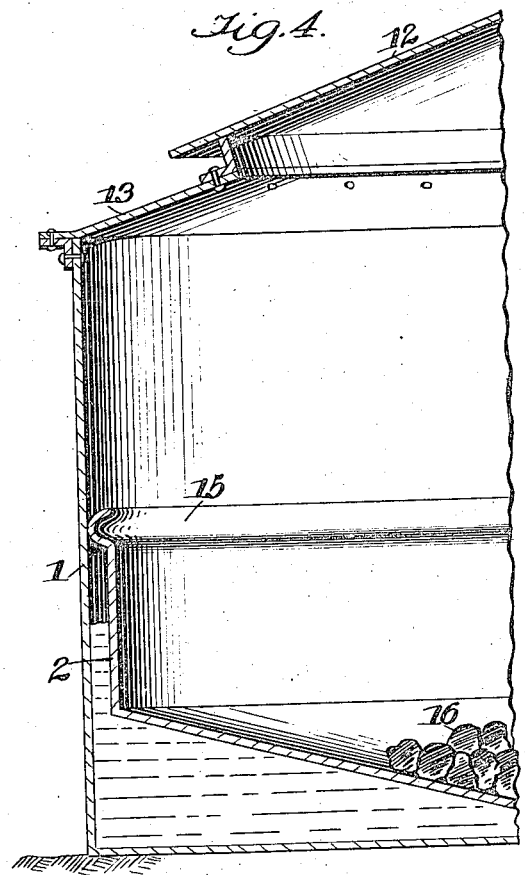
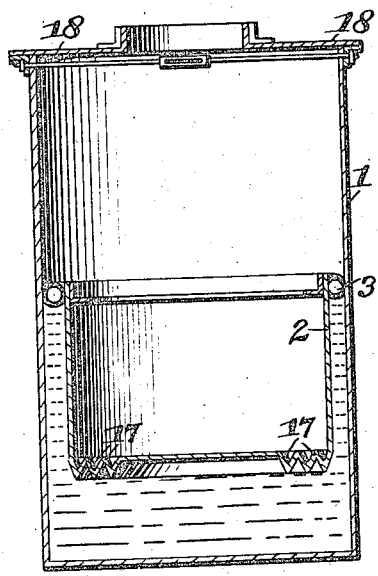
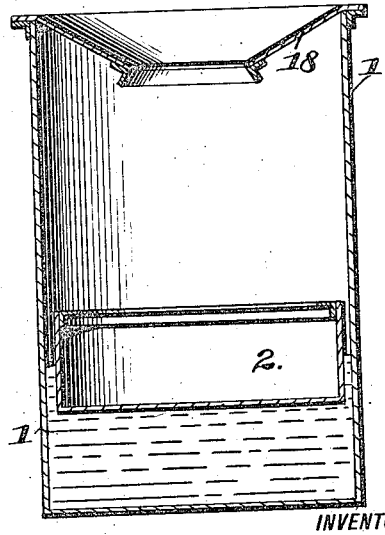
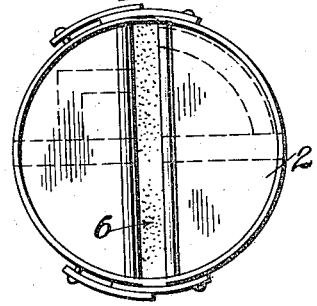
WITNESSES
George C. Myers
J. T. Schrott
INVENTOR
Wilson S. Huff.
BY
ATTORNEYS

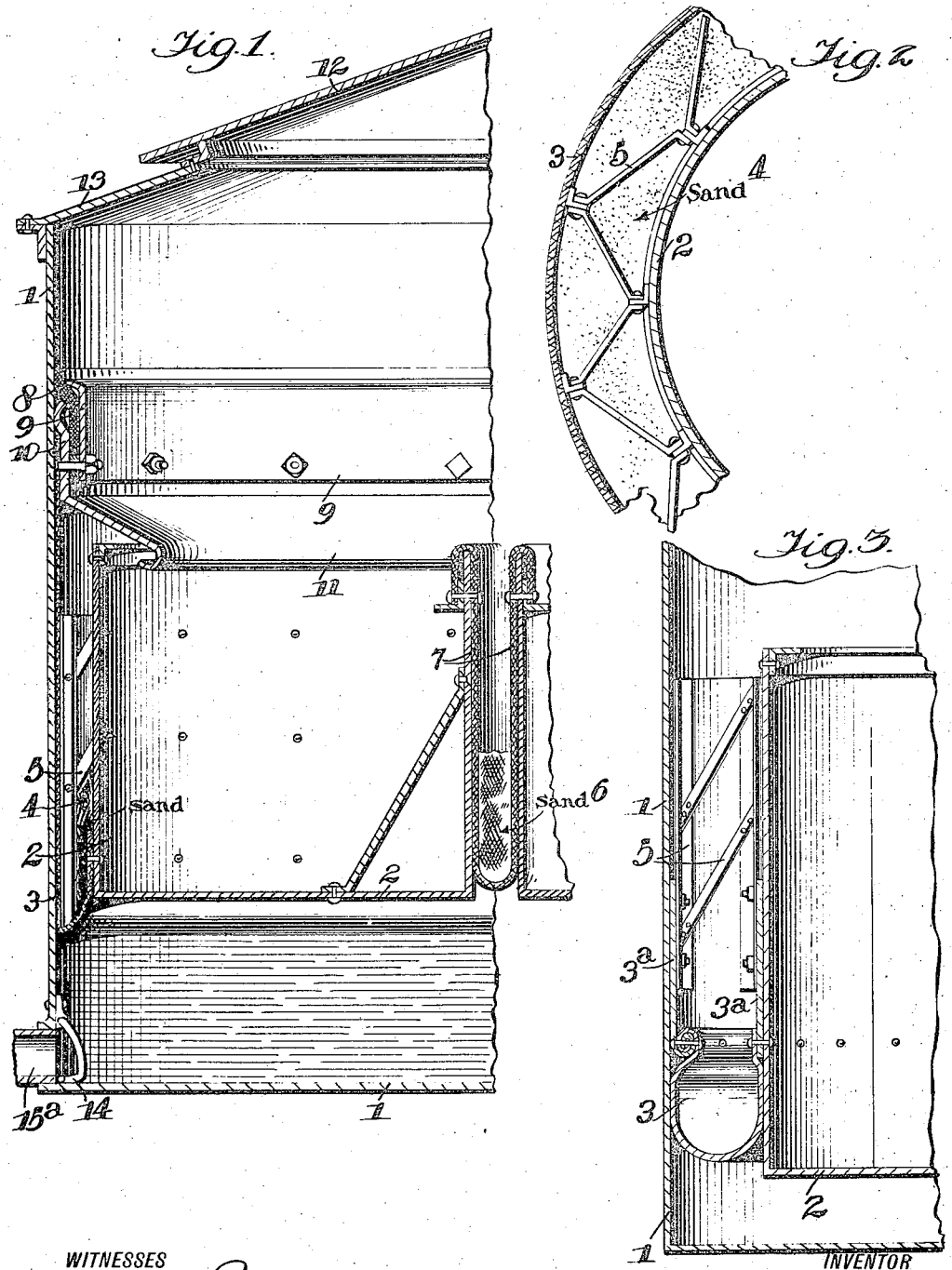

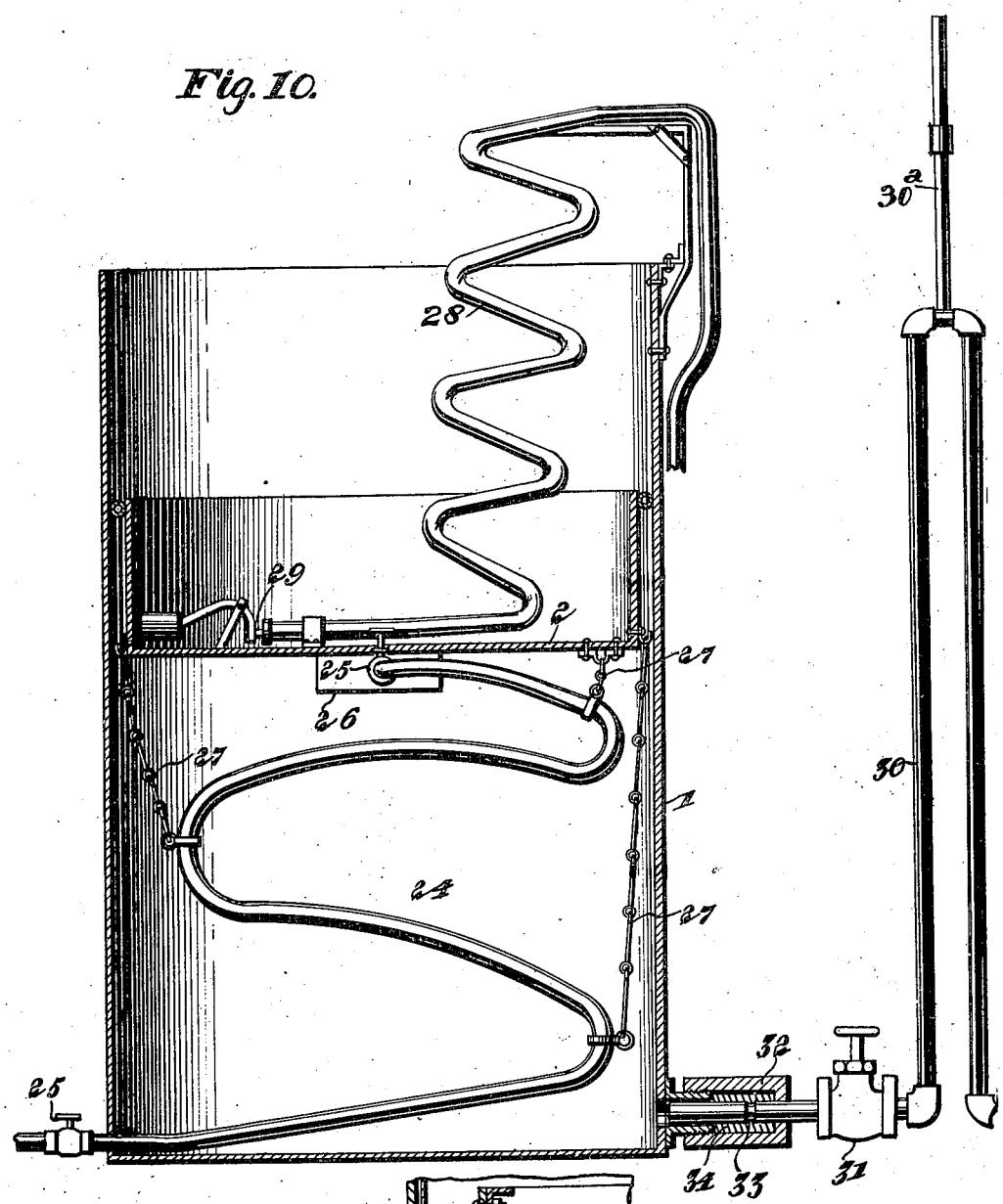

Patented July 31, 1923.

1,463,268

UNITED STATES PATENT OFFICE.

WILSON SYLVESTER HUFF, OF OKLAHOMA, OKLAHOMA.

FIREPROOF TANK.

Application filed July 21, 1919. Serial No. 312,188.

*To all whom it may concern:*

Be it known that I, WILSON S. HUFF, a citizen of the United States, and a resident of Oklahoma city, in the county of Oklahoma and State of Oklahoma, have invented certain new and useful Improvements in Fireproof Tanks, of which the following is a specification.

My invention relates to improvements in fireproof tanks, and it consists in the constructions, combinations and arrangements herein described and claimed.

The foremost object of my invention is to provide a fire-proof tank for holding oil and other inflammable liquids, the basic principle of the invention being a cover or floating tank on the oil with suitable means for sealing the joint between said floating tank and the outer stationary tank.

Other objects and advantages reside in various modifications of the above named principle, such modifications being concerned largely with variations of the structural features.

Other objects and advantages will appear in the following specification, reference being had to the accompanying drawings in which:—

Figure 1 is a partial sectional view of a large oil tank illustrating a particular type of floating tank that is made in sections especially for large tanks, Figure 2 is a detailed cross section of a part of the inner floating tank and illustrating more particularly the bracing between the tank and the wiper, Figure 3 is a detail section illustrating a modification in the wiper construction, Figure 4 is a partial sectional view illustrating a further modification in the floating tank structure, which in this case is much simplified, Figure 5 is a sectional view of a small tank with one form of floating tank, Figure 6 is a similar view showing another form of floating tank, Figure 7 is a plan view of the sectional inner tank in Figure 1.

Figure 8:
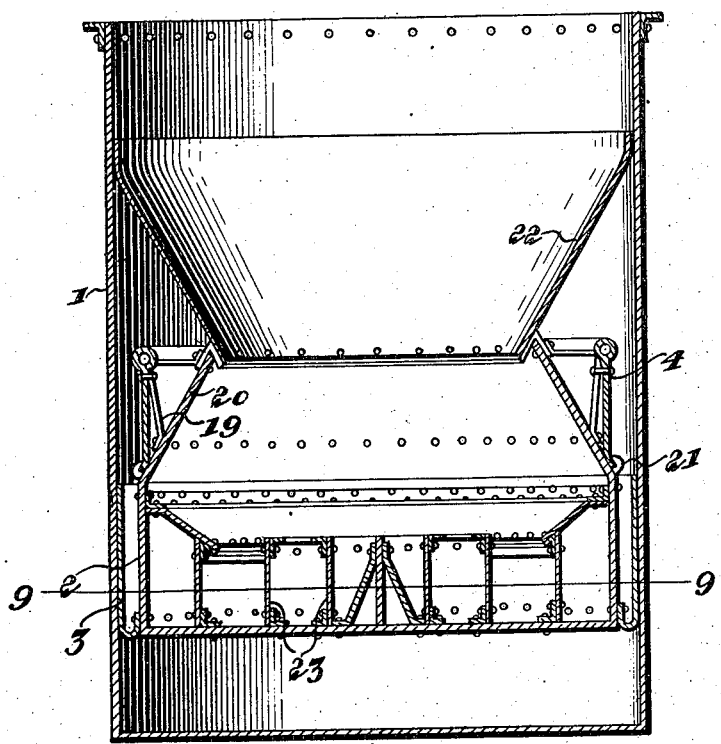
Figure 9:
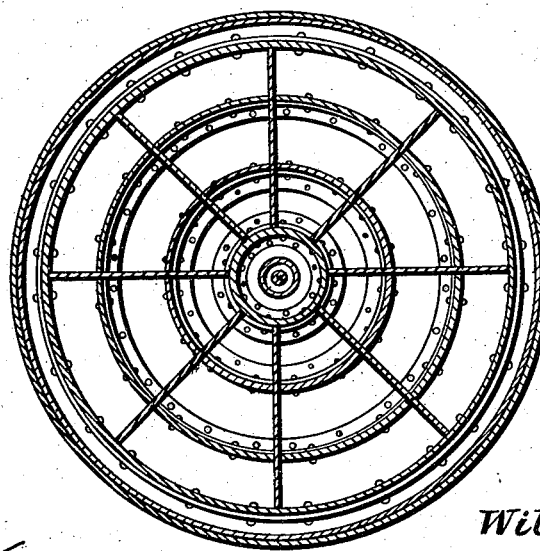

Figure 8 is a vertical section illustrating an arrangement of compartments in the floating tank, employed more especially in connection with larger types of storage tanks, Figure 9 is a detailed sectional view showing the compartments above referred to, Figure 10 is a section of a tank illustrating a modification, and Figure 11 is a detail sectional view of the sealing device preferably to be used in this type of tanks.

Before describing the invention, it should be stated that there are many forms in which the inner tank and the wiper between the two tanks can be constructed. These forms vary between large tank structures and small tank structures, and again they vary in each particular type of tank. The illustration in the drawings show representative types of the various parts of the invention, and attention is therefore directed to Figure 1 which shows one of the large tank structures.

The outer or stationary tank 1 contains oil or other inflammable liquid, and in order to prevent fire from getting to the oil an inner or floating tank 2 is placed on the surface. In the case of large tanks such as shown in Figure 1, the floating tank 2 is made in two or more sections so that any movement of the oil may not cause unusual strains on the floating tank, with the result that the joints should become separated. If desired the floating tank 2 may be in one piece.

A wiper 3 closes the joint between the inner and outer tanks. In Figure 1 the wiper 3 is made of any suitable flexible material that is capable of being pressed into close contact with the outer tank by virtue of the sand 4 which fills the lower part of the pocket formed by the wiper. The lower edge of the wiper is secured to the inner tank and an arrangement of braces 5 serves to hold the wiper in approximately its correct shape when the inner tank is removed.

Sand 6 or other suitable material, is used to fill the pocket 7 that closes the joint between the sections of the floating tank. The upper edges of the pocket are carried over the upper edges of the tank sections, where they are suitably secured and braced as shown.

As a further precaution against the entrance of foreign substances into the oil, a flexible scraper 8 is clamped in place by inner and outer clamp rings 9 and 10 that are supported on the upper part of the wiper 3. The outer clamp ring terminates in an inwardly and downwardly inclined frusto-conical portion 11 with an upwardly curled edge.

This edge comes just below the angle iron brace around the upper edge of the floating tank. The purpose of the portion 11 is to direct any water or other substance that might enter the tank 1, to the middle of the floating tank.

A cover 12 is set on the frusto-conical top portion 13 of the outer tank. A guard 14 prevents the entrance of any large particles of substance that may have gotten into the tank 1, into the outlet pipe 15ª at the bottom. The construction of the wiper 3 in Figure 3 is different from that shown in Figure 1, in that only the lower part up to where it joins the more rigid parts indicated at 3ª, is made of flexible material.

In this form of the invention, the scraper 8 with its appended parts is omitted. The parts are so constructed that the wiper 3 is simply attached in any suitabl manner to the wiper plates 3ª, and when the pocket formed by the wiper is filled with sand, the same function is performed as in the first instance.

A more simplified form of the floating tank is shown in Figure 4. Here the upper edge of the tank 2 is simply beaded at 15, and thus closes the space between the two tanks. The bottom of the floating tank is made conical so as to hold the ballast 16 in the center.

The tanks shown in Figures 5 and 6 are of the smaller types, and the construction of the floating tank 2 is correspondingly simplified. In Figure 5 the floating tank 2 has corrugations 17 near the wall of the tank, for the purpose of imparting a certain amount of flexibility to the floating tank so that it can adjust itself and overcome unequal stresses.

It is immaterial of course, what the shape of these corrugations is or as to the particular location thereof in the bottom. The wiper 3 consists of a tube of pliant material such as ordinary garden hose. Under some circumstances this wiper may not be used in connection with the floating tank that has the corrugations, because the corrugations can be employed to maintain a joint between the walls of both tanks in the event that the floating tank is intended to have a sliding fit in the storage tank. The top of the stationary tank 1 is partly closed by a cover 18 that has a central opening or vent.

In Figure 6 the floating tank 2 has no wiper, but is made nearly as large as the tank 1 on the inside. The top 18 is in the shape of a cone with a flaring opening in the center. Either of the covers in Figures 5 and 6 are removable so as to leave an opening the full diameter of the tank 1. It should be stated that preferably the larger tanks are not supplied with covers, and the cover 12 in Figures 1 and 4 is shown simply to illustrate that a cover may be used if desired.

This leads to a consideration of the forms of the invention in Figures 8 to 11. The arrangement shown in Figure 8 is intended for the rapid extinction of a fire, should it occur. Sand 4 is normally contained in a compartment 19 which includes the slanting upper portion 20 of the floating tank 2. The vertical side of the compartment is fastened to the portion 20 by a fusible substance 21, so that in case of fire, the fusible substance is melted, the side 19 separates and the sand slides into the receptacle 3, extinguishing the fire.

A deflector 22 which is suitably secured to the portion 20, has sliding engagement with the outer or storage tank 1, and serves to direct rain water into the middle of the floating tank, where the water forms into a plurality of circular pools by reason of the annular partitions 23 which are mounted on the floating tank in any suitable manner. Ordinarily the water thus collected will evaporate sufficiently to avoid the necessity of removing excessive quantities.

If desired, the water may be siphoned out. The water thus collected acts as a ballast for the floating tank, and in many respects is a better provision for this purpose than the means 16 in Figure 4. The tank in Figure 8, being one of the larger type, employs a sectional floating tank as shown in Figure 9. So far as the arrangement of the partitions 23 is concerned, the same result may be obtained in a great number of ways. For example, the individual sections in Figure 9 may be provided with circular compartments for holding the water.

In Figure 10, a flexible pipe 24 is provided for the purpose of draining the floating tank 2 of water. For this purpose, the pipe has valves 25 at both ends. The upper valve occupies a depression 26 in the bottom of the floating tank, into which the water runs. The valve, if desired, may be easily operated by a rod or wire. Flexible members 27 support the pipe 24 at suitable places.

A coiled pipe 28 may be used to siphon the water out of the floating tank. Ordinarily, either the pipe 24 or 28 will be employed in a single tank, although both may be provided in a single tank if desired. The pipe 28 includes suitable valve mechanism 29 which is necessary in the operation in siphoning the water.

A filling pipe 30 comprises an inverted U-shaped portion which is arranged to be lowered to the ground in the operation of filling the tank 1. A suitably provided windless serves to raise and lower the filling pipe. The purpose of raising the pipe is to bring the top of the pipe above the level of the oil in the tank so that the oil may not run out. The pipe 30 includes a vent pipe 30ª.

A valve 31 controls the flow of oil. This valve includes an adjacent connection 32, with a pipe having a groove 33 into which a part of the packing member 34 enters to prevent endwise movement of the pipe. The sealing device 35 illustrated in Figure 11, is preferably used in connection with the arrangement of the tanks in Figure 10. This sealing arrangement is substantially like that illustrated in Figure 1.

While the construction and arrangement of the fire proof tank is that of a generally preferred form, obviously modifications and changes may be made without departing from the spirit of the invention or the scope of the claims.

I claim:—

1. A fire-proof tank, comprising an outer stationary tank for holding inflammable liquids, an inner floating tank for protecting the surface of the liquid, means carried by the floating tank for making a flexible joint between the floating and stationary tanks and to close the space, said means including a flexible sheet of material arranged to form an annular depending pocket for holding sand, and bracing means between the floating tank and said sheet for preserving the shape thereof when the floating tank is removed.

2. A fire-proof tank, comprising an outer stationary tank for holding inflammable liquids, an inner floating tank for protecting the surface of the liquid, means carried by the floating tank for making a flexible joint between the floating and stationary tanks and to close the space, said means including a flexible sheet of material arranged to form an annular pocket for holding sand, bracing means between the floating tank and said sheet for preserving the shape thereof when the floating tank is removed, and means carried by a part of said sheet for forming a scraper against the surface of the outer tank.

3. A fire-proof tank, comprising an outer storage tank for holding inflammable liquids, an inner sectional floating tank for protecting the surface of the liquid, means carried by the floating tank for making a flexible joint between the sections of the floating tank, and between the storage and floating tanks, said means including a flexible sheet arranged to form a pocket for holding sand, bracing means between the floating tank and the outer sheet for preserving the shape of the annular pocket when the floating tank is removed, a scraper, and clamp rings carried by a part of the outer sheet for supporting the scraper, one of said clamp rings merging into a frusto-conical portion with an upwardly curled edge.

4. In a fire-proof tank, a floating tank, a sheet of flexible material secured near the bottom of said tank and arranged to form an annular pocket for holding sand, and braces extending from the floating tank to the outer vertically disposed part of said sheet.

5. The combination, of an outer stationary tank, an inner floating tank, a wiper of flexible material, secured to the floating tank and arranged to form an annular pocket for holding sand, an annular flexible scraper above the floating tank, and a pair of annular clamp rings fastened to the upper part of said wiper to move the scraper with the floating tank, one of said rings merging into a downwardly inclined frusto-conical portion with an outwardly and upwardly curled edge in a plane below the upper edge of the floating tank.

6. A tank, comprising a liquid container, a float on the surface of the liquid, and means providing a joint, including a flexible member mounted at one side on the float, the free side slidably engaging the container wall and thus forming a pocket, said pocket containing sand, or the like.

7. A tank, comprising a liquid container, a float on the surface of the liquid, and means providing a joint, including a flexible member secured at one side to the float, the free side extending in slidable engagement along the container wall to form a pocket; sand or the like in such pocket to press the free side against said wall, and bracing means between said free side and float.

8. A tank, comprising a liquid container, a float on the surface of the liquid, means providing a joint, mounted at one side on the float, the free side slidably engaging the container wall, and thus forming a pocket, said pocket containing sand, or the like; and means associated with said joint-making means for preventing foreign substances from falling into the pocket.

9. A tank, comprising a liquid container, a float on the surface of the liquid, means providing a joint, including a member secured at one side to the float, the free side slidably engaging the container wall, and thus forming a pocket, said pocket containing sand or the like; and means carried by said free side extending over the float sufficiently far to prevent foreign substances from falling upon the sand.

10. A tank, comprising a liquid container, a float on the surface of the liquid, means providing a joint, including a flexible member secured at one side to the float, the free side slidably engaging the container wall and thus forming a pocket, said pocket containing sand or the like; and means carried by said free side comprising a combined container wall-scraper and sand pocket-protector.

11. A tank comprising a liquid container, a float adapted to be supported on the surface of the liquid, means providing a joint mounted on the float, the free side of said means slidably engaging the container wall and thus forming a pocket, said pocket containing a substance acting by its weight to maintain the said free side in wiping engagement with the tank wall.

12. A tank comprising a liquid container, a float adapted to be supported on the surface of the liquid, means providing a joint mounted at one side on the float, the free side slidably engaging the container wall and thus forming a pocket, said pocket containing a substance acting by its weight to maintain the said free side in wiping engagement with the tank wall.

13. A tank comprising a liquid container, a float adapted to be supported on the surface of the liquid, means providing a joint mounted on the float, the free side of said means slidably engaging the container wall and thus forming a clearance between the slidable free side and the float, said clearance containing a substance acting by its weight to maintain the said free side in wiping engagement with the tank wall.

WILSON SYLVESTER HUFF.